2 Sheets—Sheet 1.

S. PATTON.
COMBINED CORN HARVESTER AND HUSKER.

No. 103,362.            Patented May 24, 1870.

Witnesses:

Inventor:
S. Patton
per Munn & Co
Attorneys.

2 Sheets—Sheet 2.

S. PATTON.
COMBINED CORN HARVESTER AND HUSKER.

No. 103,362.          Patented May 24, 1870.

Witnesses:
Victor Hagmann
C. A. Pettit

Inventor:
S. Patton
per Munn & Co.
Attorneys.

United States Patent Office.

SAMUEL PATTON, OF CHATSWORTH, ILLINOIS, ASSIGNOR TO HIMSELF, JOHN M. LONG, AND ROBERT ALLSTATTER, OF HAMILTON, OHIO.

*Letters Patent No. 103,362, dated May 24, 1870.*

IMPROVEMENT IN COMBINED CORN-HARVESTER AND HUSKER.

The Schedule referred to in these Letters Patent and making part of the same.

*To all whom it may concern:*

Be it known that I, SAMUEL PATTON, of Chatsworth, in the county of Livingston and State of Illinois, have invented a new and improved Corn-Harvester and Husker; and I do hereby declare that the following is a full, clear, and exact description of the same, reference being had to the accompanying drawings forming a part of this specification, in which—

Figure 1:
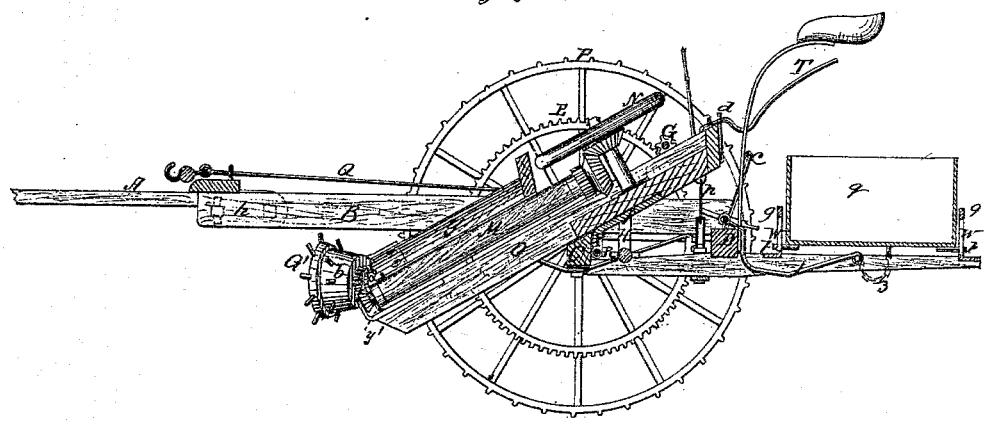
Figure 2:
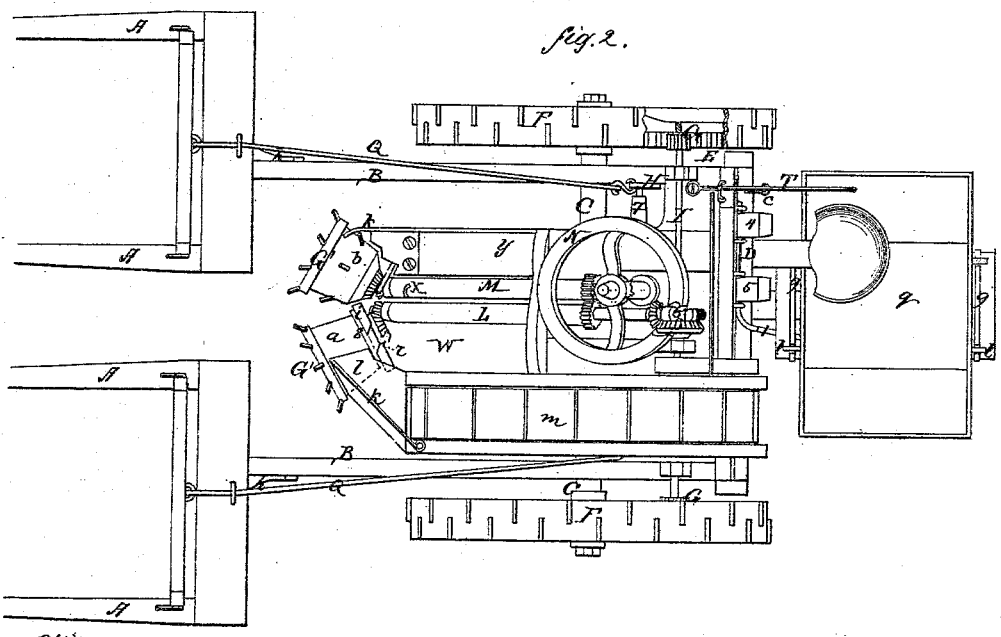
Figure 3:
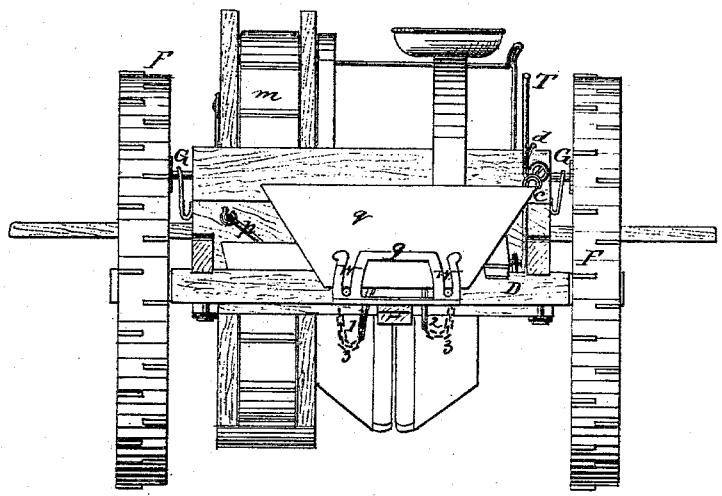

Figure 1 is a sectional elevation;

Figure 2, a plan view;

Figure 3, a rear elevation; and

Figure 4:
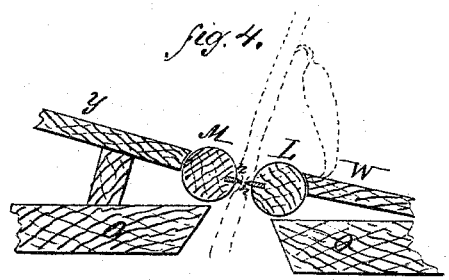

Figure 4, a detached section through the husking rollers.

This invention relates to a machine constructed for husking a row of corn as it stands in the field as fast as a span of horses will walk.

The invention consists in a variety of devices adapted to discharge these functions, as hereinafter more fully appears.

In the drawings,—

A A are pairs of thills attached to the front ends of spring bars B B by means of adjustable joints $h$ $h$, and arranged so as to pass at each side of the row, so as to allow the horses to work in front of the machine without breaking down the stalks.

The adjustable joints $h$ $h$ allow the height of the husking mechanism to be regulated by raising or lowering the front ends of the spring-bars B B and the rear ends of the thills A A.

The bars B B vibrate sidewise, allowing the horses all the freedom of motion necessary, yet being stiff enough to enable them to direct the course of the machine in the most perfect manner, they being bolted fast to the axle-tree C, and braced by a frame-work behind it. And by being thus attached to and in rear of the axle and passing forward between the wheels and pivoted frame, the point of attachment of the thills is brought near the drums and rollers, and, at the same time, the full advantage of the long spring bar is obtained.

The draft-rods Q Q are placed over the spring bars B B for the purpose of enabling the draft to counterbalance the weight on the rear part of the machine.

The rods Q Q pass through and slide in eyes on the cross-bars of the thills A A, and terminate in hooks or equivalent devices, for receiving the whiffletrees, to which the horses are attached, while the rear ends of the rods are attached to the levers H H, by which a backward draft is brought upon the evener 7.

The levers H H, in conjunction with the evener 7, prevent the horses from pulling unequally.

The levers H H are attached to the spring-bars B B back of the axle-tree C, by means of pivot-bolts.

The levers are provided with orifices at their lower ends that receive pins projecting from the ends of the evener 7, while their upper ends are each pierced with a series of perforations to receive the hooks on the rear ends of the draft-rods Q Q, by means of which perforations the rods may be raised or lowered for the purpose of regulating the amount of draft used to counterbalance the weight on the rear of the machine.

The frame O, to which the husking mechanism is attached, is pivoted to the axle-tree C, by means of the hinges R R, which are placed out of line with the centers of the draft-wheels F F, so as to enable the machine to be thrown in or out of gear by changing the inclination of the frame O, which is done by raising or depressing the lever T, thus throwing the pinions G G into or out of contact with the toothed rims E E, whether the toothed rims be provided with inside or outside gear.

When the frame O is thrown into position for husking, the pinions G G are prevented from engaging too deeply with the toothed rims E E, by means of the chains $p$ $p$, which are fastened to the cross-bar of the frame O, near its outer ends, and also at or near the center of the frame-work beneath such cross-bar.

When the lever T is depressed it is held in that position by the hook $c$ and spring $d$, and the machine moves forward without imparting motion to the husking mechanism, the front end of the frame O being raised out of the way of any obstructions that are ordinarily met with while traveling over rough ground, the lever T being in a convenient position to be operated by the driver while sitting in the seat.

The frame O has a cross-bar framed on its rear end, for the purpose of giving support to the shaft I, and is re-enforced on its upper side to prevent springing, and is greatly stiffened by a rib extending across its rear end, a plate extending across its upper side, and the plate $f$ on the under side, the front edge of which plate $f$ is bent down, forming the rib P, immediately behind the axle C, which rib is also of great service in stiffening the frame O, and its projecting ends are jointed to the axle C, thus allowing the frame O to vibrate vertically.

The draft-wheels F F run loose on the axle C, and are provided with toothed rims E E.

When the frame O is thrown in position for husking, the toothed rims E E engage with the pinions G G on the shaft I.

The pinions are placed on clutches that are keyed fast to the shaft I, and give motion to the husking mechanism by means of the bevel-wheel K, that is also keyed fast to the shaft I.

The husking-rollers L M are geared together and receive motion from the bevel-wheel K, an elongation of the roller L being provided with a bevel pinion for that purpose, while a bevel-wheel on the rear end of the roller M gives motion to the balance-wheel N.

The hub of the balance-wheel N terminates on the under side in a bevel pinion, and forms a sleeve, which receives a shaft that is firmly fastened to the frame O, and furnishes a bearing for the upper end of the roller M.

The balance-wheel N runs loose on this shaft, and receives motion from the roller M by means of the bevel-pinion referred to, the balance-wheel being in a convenient position and operating directly on the husking-rollers.

For the purpose of preventing hanging ears of corn from entering between the husking-rollers point foremost, the husking-roller M is sufficiently elevated above its fellow to incline the stalks of corn to one side, thus causing the points of hanging ears to strike on the board W, while the downward motion of the stalks as they pass between the husking-rollers, brings the butts of the ears against the rollers in the proper position, and inclines the ears so that they fall over toward the elevator m, when husked.

The elevation of the roller M above the roller L renders the use of an additional roller or other device for a similar purpose unnecessary, and thus simplifies the machine.

If one roller were placed directly over the other, the stalks of corn would be prevented from entering between the two at their front ends.

The board W is placed by the side of the roller L, for the purpose of preventing ears of corn from hanging so far over the roller as to be snapped off by the rapid downward motion of the stalks while passing between the rollers L M, and also, in conjunction with the board Y, to prevent ears of corn from falling to the ground when husked.

The manner of removing the ear of corn from the husk is substantially the same as that for which Letters Patent were granted to me bearing date August 18, 1868, and numbered 81,202.

The toothed and flanged drum a, and the toothed drum b, are arranged forward of the husking-rollers, and work on journals or axles placed at obtuse angles with such rollers.

The office of the drums is to collect the stalks of corn and pass them in between the husking rollers at regular intervals. For this purpose a notched flange, i, is placed on the rear of the drum a, and works so close to the rear end of the drum b, as to prevent stalks of corn from passing between the drums, except when taken in by the notches in the flange.

The notches are not large enough to admit more than one stalk of corn at a time, and they consequently pass the stalks in between the husking-rollers L M at regular intervals, while the flange i turns the stalk backward at an acute angle with the rollers L M, in which position they pass between the rollers, and thus continually make room for other stalks to enter.

The rear edge of the flange i is provided with the projecting points r, for the purpose of conveying ears of corn that may chance to fall on the husking-rollers away therefrom over toward the elevator m.

The roller M is provided, near its forward end, with the cam x, for the purpose of preventing ears of corn that may chance to fall on the husking-rollers from being caught and shelled by the ribs n on the rollers L M.

The cam throws the ears over against the flange i, the projecting points r of which carry them over toward the elevator m, thus keeping the rollers clear for the entrance of stalks. This cam may be fixed as shown, or allowed to spring back against the roller, to which it is attached, by the pressure of the stalks as they pass.

The front ends of the rollers L M are provided with bevel-pinions for the purpose of imparting motion to the gathering-drums a b, by engaging with teeth on the rear ends of the same. To prevent stalks of corn or refuse matter from collecting on the pinions and journals of the forward ends of the husking-rollers, the guards y' project upward from the frame or bearing-plates beneath the rollers, and enter grooves at the rear ends of the pinions referred to.

The front ends of the gathering-drums a b are provided with the rims G' G', whose function it is to raise the stalks of corn or refuse matter, taken up by their teeth, sufficiently to prevent them from being caught by the points of the guards k k.

The apron l is placed over the gathering-drum a for the purpose of preventing the accumulation of stalks or refuse matter behind the drum a, which might otherwise be carried thither by the notches in the flange i. The apron also prevents ears of corn from escaping at the front end of the machine when husked, while the rim 8 beneath the flange i is used for the purpose of raising stalks and refuse matter, to prevent them from being caught on the edge of said flange.

The axles of the gathering-drums a b are placed at obtuse angles with the husking-rollers, and diverge from each other, their front ends being furthest apart.

The forward ends of the gathering-drums a b, are provided with teeth, that project outward and forward, for the purpose of gathering in the stalks of corn, while teeth further back on the drum b assist in carrying the stalks backward, and also hold them from escaping until they are passed between the husking-rollers by the notches in the flange i on the drum a.

Stalks of corn that are leaning generally have to be moved further than those standing upright, and, consequently, have to be moved quicker, in order to get them into the husking-rollers in time. The gathering-drums a b, being inclined slightly upward, draw the standing stalks of corn backward as gradually as if it were done by a screw, while stalks that are leaning are raised and carried back more quickly. The gathering-drums a b, being arranged in this position, take hold of stalks in any position in which they may be found, and pass them in between the husking-rollers, one after another, at regular intervals, and in the proper manner, their position being such that the more a stalk leans the more quickly it will be moved.

The ears of corn, when husked, are conveyed by the elevator m to the box q, which rests on two sets of pivots, in order that it may retain a horizontal position while being filled, and yet be dumped either to the right or left, as required. Its sides are beveled, to facilitate the escape of the corn in dumping.

To enable the corn-box q to be dumped either to the right or left without displacing it, the plates 9 9, in front of and behind it, are provided with the curved slats w. The pivots t of the dumping-box q operate in these slats; the lower ends of which furnish the pivots with bearings.

There are two pedals, 4 and 5, within convenient distance of the driver's seat, which is bolted fast to the cross-bar D, the latter also giving support to the bearings of the rod 1.

The rod 1 passes through and works loose in the left pedal 5, but is made fast to the right pedal 4, and is moved by it. The rod 1 is bent backward at its left end, beneath the bottom of the dumping-box q, on the left side of the latter, and is connected therewith by one of the chains 3, or its equivalent.

The left pedal is provided with the rod 2, which is made fast to it, and, passing beneath the bottom of the dumping-box q on its right side, is connected therewith by means of one of the chains 3, or its equivalent.

The driver, while sitting in the seat, operates the dumping-box q with his feet, by means of the pedals 4 and 5, on which they rest. The toe of his right foot being pressed down on the front end of the right pedal 4 moves the rod 1, which, pressing up against the bottom of the box q on the left side, causes it to tip over, emptying the corn on the right side of the row that is being husked. He then presses his heel on the rear end of the same pedal, causing the chain 3 to pull the box back to a horizontal position.

The left pedal 5, being worked by the driver's left foot, operates in a similar manner, dumping the corn on the left side of the row.

This arrangement enables the driver, while working back and forth on the same side of the field, to always keep the space clear of corn between the row he is husking and the one next to be husked, thus preventing the piles of husked corn from being trampled under foot while husking the next row.

If, instead of dumping the corn in piles, it should be desirable to convey it directly to a wagon, a carrier may be attached to the upper end of the elevator $m$, and extend outward beyond the draft-wheel F. This carrier may receive motion from bevel-gear on the upper shaft of the elevator $m$, and may be attached or removed at pleasure.

It is sometimes desirable to snap the ears of corn from the stalks without removing the husk from them. For the purpose of arranging this machine so that it will do the work in this manner, the relative position of the ribs $n$ on the rollers L M is changed, so that they will strike the butts of the ears of corn alternately, instead of closing on them simultaneously, as they do when husking. By this arrangement of the ribs the stem of the ear is broken off lower down, removing only the outside husk therefrom, while all of the husk that is of any value for mechanical or other purposes is left on the ear, and may be afterward removed and used without resorting to the tedious operation of assorting.

To provide a convenient method of changing the relative position of the ribs $n$ $n$ on the rollers L M, the journal on the rear end of the roller L works in the bearing 6, which is provided with a shank that, passing through a slot in the frame O, holds the bearing 6 in its proper position by means of a screw and nut, or nuts, on the under side of the frame O.

When it is desirable to change the relative position of the ribs $n$ $n$ on the rollers L M, the nut or nuts on the lower end of the bearing 6 are unscrewed, and the bearing is moved backward, thus freeing it from the journal on the rear end of the roller L, and allowing the roller L to be moved out of gear with the roller N, when, the rollers being turned so that the ribs $n$ come in the desired position, the roller L is replaced in gear with the roller M, and the journal on its rear end being replaced in the bearing 6, the latter is screwed fast to the frame O by means of the nut or nuts on its lower end, thus providing a convenient and quick method of changing the operation from husking to snapping the ears of corn, and *vice versa*.

Having thus described my invention,

What I claim as new, and desire to secure by Letters Patent, is—

1. The combination of a pair of thills, A A, with each spring-bar B, arranged in relation to the frame O, in the manner and for the purpose specified.

2. The combination of the vertically adjustable draft-rods 2 2, evener 7, and levers H, when the latter are pivoted to the spring-bars B, in rear of the axle, for the purpose of enabling the draft to balance weight on the rear of the machine, substantially as described.

3. The arrangement of the plate $f$ having the rib P and joints R, with the frame O and axle C, all being constructed and operating substantially as described.

4. The drums $a$ and $b$, when constructed as described, and arranged forward of the husking-rollers, for the purpose specified.

5. The notched flange $i$ on the rear of the drum $a$, for the purpose specified.

6. The projections or points $r$ on the rear of the flange $i$, for the purpose specified.

7. The cam X attached to the roller M near its front end, and radially in front of the rib $n$, for the purpose of preventing ears of corn from being caught by the ribs.

8. The guards $y'$ combined with the pinions on the rollers L M, as and for the purpose specified.

9. The rims G' G' on the front ends of the drums $a$ $b$, when used in connection with the guards $k$, for the purpose specified.

10. The apron $l$, in connection with the drum $a$, having the rim 8, for the purpose specified.

11. The arrangement of the axles of the drums $a$ and $b$ at obtuse angles with the husking-rollers, as specified.

12. The arrangement of the corn-box $q$, plates 9, rods 1 and 2, and pedals 4 and 5, constructed and operating substantially as described.

SAMUEL PATTON.

Witnesses:
NATHAN K. ELLSWORTH,
CHAS. A. PETTIT.